United States Patent
Muzzo et al.

(10) Patent No.: US 12,467,540 B2
(45) Date of Patent: Nov. 11, 2025

(54) CLOSING MEMBER OF A GAS VALVE FOR VERY HIGH PRESSURE

(71) Applicant: Rotarex S.A., Lintgen (LU)

(72) Inventors: Paul Muzzo, Yutz (FR); Guillaume Massin, Heisdorf (LU); Philippe Schmitz, Steinsel (LU)

(73) Assignee: ROTAREX S.A., Lintgen (LU)

( * ) Notice: Subject to any disclaimer, the term of this patent is extended or adjusted under 35 U.S.C. 154(b) by 55 days.

(21) Appl. No.: 17/802,330

(22) PCT Filed: Feb. 25, 2021

(86) PCT No.: PCT/EP2021/054711
§ 371 (c)(1),
(2) Date: Aug. 25, 2022

(87) PCT Pub. No.: WO2021/170731
PCT Pub. Date: Sep. 2, 2021

(65) Prior Publication Data
US 2023/0101730 A1    Mar. 30, 2023

(30) Foreign Application Priority Data
Feb. 25, 2020 (LU) ........................ 101650

(51) Int. Cl.
*F16K 1/30* (2006.01)
*F16K 1/46* (2006.01)
*F17C 13/04* (2006.01)

(52) U.S. Cl.
CPC ................ *F16K 1/302* (2013.01); *F16K 1/46* (2013.01); *F17C 13/04* (2013.01);
(Continued)

(58) Field of Classification Search
CPC . F16K 1/302; F16K 1/46; F16K 1/482; F16K 1/02; F17C 13/04; F17C 2205/0323;
(Continued)

(56) References Cited

U.S. PATENT DOCUMENTS

| | | | | |
|---|---|---|---|---|
| 1,526,248 A | * | 2/1925 | Small | F16K 1/46 251/88 |
| 2,414,908 A | * | 1/1947 | Smith | F16K 1/46 251/333 |

(Continued)

FOREIGN PATENT DOCUMENTS

| | | |
|---|---|---|
| CH | 409558 A | 3/1966 |
| DE | 1110483 | 7/1961 |

(Continued)

OTHER PUBLICATIONS

International Search Report for PCT/EP2021/054711 mailed May 3, 2021.
Written Opinion for PCT/EP2021/054711 mailed May 3, 2021.

*Primary Examiner* — Craig M Schneider
*Assistant Examiner* — Andrew J Rost

(57) ABSTRACT

A valve closing member for cooperating with a valve seat, comprising: a body a front circular face forming a central protrusion along a longitudinal axis of the body; a seal forming a ring fitted on the front circular face and around the central protrusion; and a retainer forming a ring surrounding the seal and attached to the body for retaining the seal on the body; wherein the seal shows a radially inner surface contacting a radially outer surface of the central protrusion, the radially inner surface and radially outer surface being both cylindrical, the radially outer surface showing at least one circular groove into which the seal is radially pressed by the retainer.

14 Claims, 2 Drawing Sheets

(52) U.S. Cl.
CPC .............. *F17C 2205/0323* (2013.01); *F17C 2205/0382* (2013.01); *F17C 2223/036* (2013.01)

(58) Field of Classification Search
CPC ...... F17C 2205/0382; F17C 2205/0329; F17C 2223/036; F17C 2223/0123
See application file for complete search history.

(56) References Cited

U.S. PATENT DOCUMENTS

| | | | | |
|---|---|---|---|---|
| 2,959,392 | A * | 11/1960 | Von Platen | F16K 1/422 251/332 |
| 4,228,987 | A | 10/1980 | Potter | |
| 4,659,060 | A | 4/1987 | Scheffel | |
| 4,659,061 | A * | 4/1987 | Scheffel | F16K 1/46 251/210 |
| 4,688,757 | A * | 8/1987 | Cook | F16K 1/46 251/210 |
| 4,951,707 | A * | 8/1990 | Johnson | F04B 53/1025 251/332 |
| 5,480,163 | A * | 1/1996 | Miser | F16J 15/3236 277/439 |
| 5,937,895 | A * | 8/1999 | Le Febre | F16K 1/305 251/118 |
| 6,007,609 | A * | 12/1999 | Semerdjian | F16K 1/305 222/189.1 |
| 6,045,115 | A * | 4/2000 | Martin, Jr. | F16K 1/305 138/44 |
| 6,354,565 | B1 * | 3/2002 | Doust | F16K 1/36 251/332 |
| 7,708,028 | B2 * | 5/2010 | Brown | F16K 1/305 251/118 |
| 8,141,849 | B1 * | 3/2012 | Blume | F16K 1/38 137/516.29 |
| 8,297,593 | B2 | 10/2012 | Muzzo et al. | |
| 9,291,274 | B1 * | 3/2016 | Blume | F16K 15/063 |
| 10,001,221 | B2 * | 6/2018 | Schmit | F16K 1/46 |
| 2010/0001222 | A1 | 1/2010 | Muzzo et al. | |
| 2016/0208931 | A1 * | 7/2016 | Yikun | F16K 1/46 |

FOREIGN PATENT DOCUMENTS

| | | |
|---|---|---|
| FR | 2165250 A5 | 8/1963 |
| GB | 875446 A | 6/1961 |
| WO | 2015044044 A1 | 4/2015 |
| WO | 2020016211 A1 | 1/2020 |

\* cited by examiner

CLOSING MEMBER OF A GAS VALVE FOR VERY HIGH PRESSURE

CROSS-REFERENCE TO RELATED APPLICATIONS

The present invention is the US national stage under 35 U.S.C. § 371 of International Application No. PCT/EP2021/054711 which was filed on Feb. 25, 2021, and which claims the priority of application LU101650 filed on Feb. 25, 2020 the contents of which (text, drawings and claims) are incorporated here by reference in its entirety.

FIELD

The invention is directed to the field of valves for compressed gas.

BACKGROUND

Prior art patent document published U.S. Pat. No. 8,297,593 B2 discloses a manual shut-off valve for compressed gas. The valve comprises a closing member that is movable relative to a seat formed in the body of the valve. The closing member comprises a body with a front circular face forming a central protrusion along a longitudinal axis of said body, a seal forming a ring fitted on the front circular face and around the central protrusion, and a retainer forming a ring surrounding the seal and attached to the body for retaining said seal on said body. The central protrusion shows a radially outer surface that tapers from the front circular face and with a bead at a distal end for securing the seal. This means that the seal need to be elastically deformed, by extension, during mounting on the central protrusion. The engagement between the seal and the body, in particular between the radially inner surface of the seal and the corresponding radially outer surface of the central protrusion, is designed to be subject to pressure of up to 300 bar.

Prior art patent document published WO 2015/044044 A1 discloses a shut-off valve for compressed gas, comprising a closing member cooperating with a seat, the closing member being located upstream of the seat and comprising an elongate member that extends through the seat downwardly. The shut-off valve is of the self-closing type in that a spring located upstream of the seat urges the closing member against said seat for closing the gas passage. Once the gas passage is closed, the pressure upstream, i.e. at the inlet, urges the closing member against the seat. The closing member comprises a body with a front face and a central elongate member around which the seal is fitted and vulcanized. A sleeve is slid longitudinally along the outer surface of the seal in order to house said seal. This construction of the closing member is useful for self-closing valve using a softer seal material. It is not adapted for shut-off valves where the closing member is located downstream of the seat and operated by a mechanism urging the closing member against the force exerted by the inlet pressure.

SUMMARY

The invention has for technical problem to overcome at least one drawback of the above cited prior art. More specifically, the invention has for technical problem to provide a shut-off valve for compressed gas that is highly reliable and compatible for very high inlet pressures, e.g., above 300 bar.

The invention is directed to a valve closing member for cooperating with a valve seat, comprising a body with a front circular face forming a central protrusion along a longitudinal axis of the body; a seal forming a ring fitted on the front circular face and around the central protrusion; and a retainer forming a ring surrounding the seal and attached to the body for retaining the seal on the body; wherein the seal shows a radially inner surface contacting a radially outer surface of the central protrusion, the radially inner surface and radially outer surface being both cylindrical, the radially outer surface showing at least one circular groove into which the seal is radially pressed by the retainer.

Advantageously, the at least one circular groove is on a longitudinally intermediate portion of the radially outer surface, meaning that the at least one circular groove is longitudinally distant from each of two longitudinally opposed ends of the radially outer surface.

According to an exemplary embodiment, the radially inner and outer surfaces being both cylindrical extend longitudinally over an entire active length of the central protrusion.

According to an exemplary embodiment, the radially inner and outer surfaces being both cylindrical extend longitudinally from the front face until a distal end of the central protrusion.

According to an exemplary embodiment, each of the at least one circular groove shows a width that is less than 50%, in various instances less than 40%, for example less than 30% of a total length in the longitudinal direction of the central protrusion along the radially outer surface thereof.

According to an exemplary embodiment, the at least one circular groove comprises at least two of the circular grooves.

According to an exemplary embodiment, the at least one circular groove is formed on a proximal half portion of the radially outer surface of the central protrusion, the proximal half portion being adjacent to the front circular face.

According to an exemplary embodiment, the at least one circular groove shows a penetration direction that is inclined relative to a plane perpendicular to the longitudinal axis, the inclination being oriented away from the front circular face.

According to an exemplary embodiment, the inclination of the penetration direction of the at least one circular groove is of an angle α comprised between 30° and 60°.

According to an exemplary embodiment, the retainer has a radially inner surface showing a cross-sectional profile that is L-shaped with a shorter distal radially extending branch and a longer longitudinally extending branch.

According to an exemplary embodiment, the longer longitudinally extending branch of the L-shaped cross-sectional profile of the radially inner surface of the retainer comprises a proximal end portion that tapers radially outwardly.

According to an exemplary embodiment, the shorter radially extending branch of the L-shaped cross-sectional profile of the radially inner surface of the retainer is curved and concave so that a distal end of the branch forms a rip oriented longitudinally towards the seal.

According to an exemplary embodiment, the seal has a radially outer surface showing a cross-sectional profile that is L-shaped and is contacted by the L-shaped cross-sectional profile of the radially inner surface of the retainer.

According to an exemplary embodiment, the L-shaped profile of the cross-section of the radially outer surface of the seal comprises a shorter distal radially extending branch and a longer longitudinally extending branch, wherein at least one, in various instances both, of the branches being straight before the retainer is mounted to surround the seal.

According to an exemplary embodiment, the retainer is attached to the body by a welding seam at an outer periphery of the retainer and the body.

The invention is also directed to a valve for compressed gas, comprising: a valve body with a gas inlet, a gas outlet and a gas passage fluidly interconnecting the gas inlet and gas outlet; a seat in the valve body and crossed by the gas passage; a closing member configured for cooperating with the seat for selectively opening and closing the gas passage; an actuating mechanism for moving the closing member between an opening position and a closing position of the gas passage; wherein the valve closing member is according to the invention.

The invention is particularly interesting in that it provides a more reliable valve closing member, in particular for application at very high pressures, e.g., above 300 bar. The seal material penetrating the at least one circular grooves formed on the radially outer surface of the central protrusion forms a gas tight barrier preventing amounts of compressed gas to penetrate between the circular front face of the closing member body and the rear face of the seal in vis-à-vis thereof, which could then move the seal out of position and cause malfunction of the valve.

DRAWINGS

DETAILED DESCRIPTION

Figure 1:
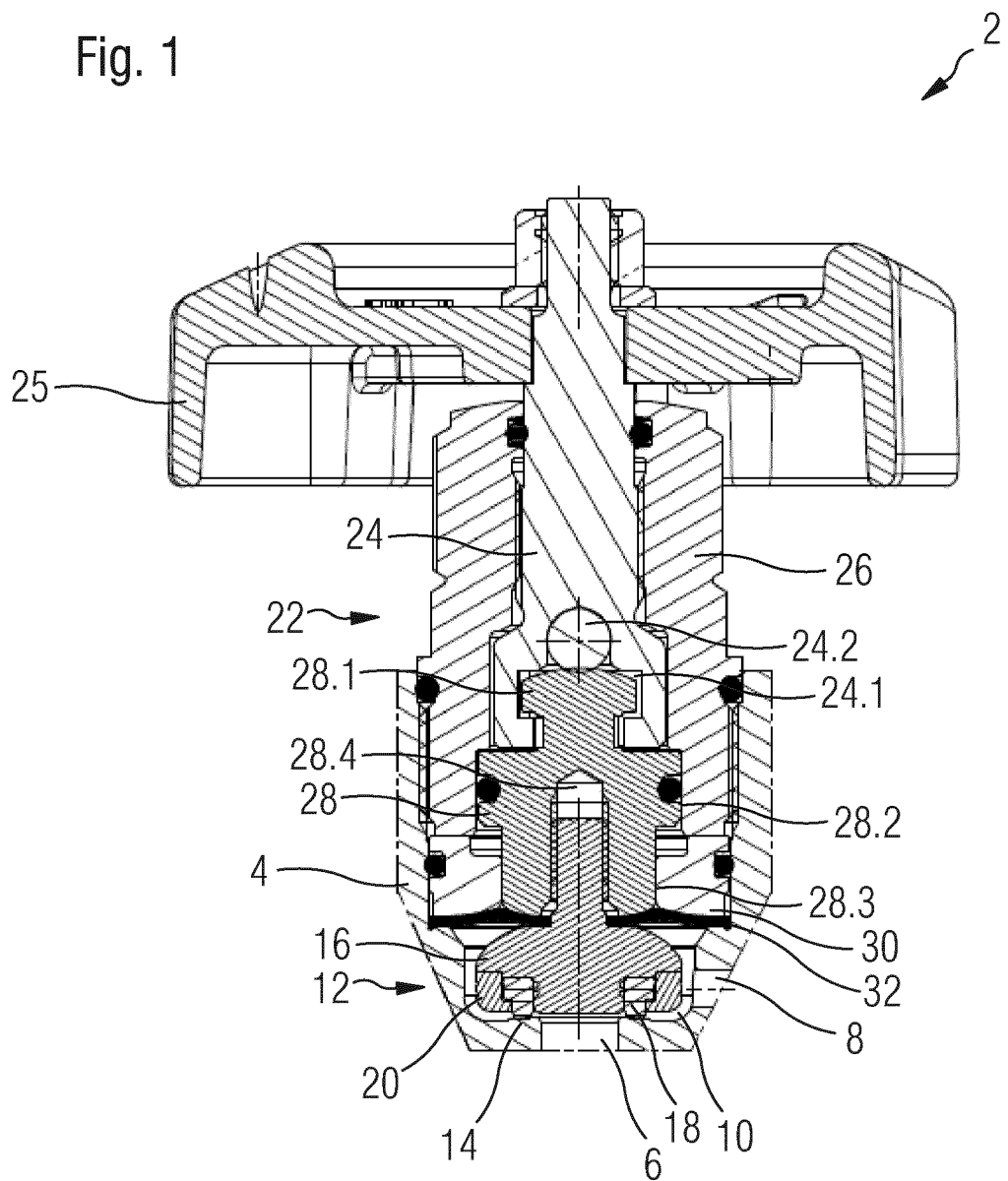
FIG. 1 is an exemplary sectional view of a gas valve according to various embodiments of the invention.

FIG. 1 is longitudinal sectional view of a gas valve according to the invention.

The gas valve 2 in FIG. 1 is for instance a shut-off valve, i.e., a valve designed for selectively closing or opening the gas passage, contrary to a regulation valve designed for controlling the pressure and/or flow of gas through the valve. The invention is however applicable to a regulation valve.

The gas valve 2 comprises a valve body 4 which is only partially represented, showing however all functional features of the valve. The valve body 4 comprises a gas inlet 6, a gas outlet 8 and a gas passage 10 fluidly interconnecting the gas inlet and outlet. The gas valve 2 further comprises a movable closing member 12 and a corresponding seat 14. The seat 14 is for instance formed directly in the valve body 4 but could also be formed by a separate part mounted on and attached to the valve body 4. The seat 14 is ring-shaped and surrounds the gas passage 10. For instance the seat 14 forms a ring-shaped bossing on a bottom face of a bore formed in the valve body 4, crossed by a through-hole forming the gas passage 10 at the inlet 6. The closing member 12 comprises a body 16, in various instances made of metal, with a central protrusion on a front circular face, a seal 18 that is ring-shaped and fitted around the central protrusion and on the front face, and a retainer 20 forming a ring surrounding the seal and attached to the valve body 4. The closing member 12 will be detailed in relation with FIGS. 2 and 3.

Still in FIG. 1, the gas valve 2 comprises also an actuating mechanism 22 for moving the closing member 12 between an opening position and a closing position of the gas passage 10. The actuating mechanism 22 comprises a spindle 24 inserted into and supported by a bushing 26 rigidly mounted on the valve body 4, and a closing member carrier 28 anchored to proximal end of the spindle 24. A hand-wheel 25 is attached to a distal end of the spindle 24 for rotating the spindle and thereby selectively opening or closing the valve depending on the rotation direction. For instance, the spindle 24 comprises an outer thread engaging with a corresponding inner thread in the bushing 26, meaning that rotation of the spindle 24 causes a translational movement along the longitudinal axis of the spindle. The proximal end of the spindle 24 forms a generally U-shaped cavity 24.1 with two retaining arms longitudinally engaging with a circular protruding portion 28.1 of the closing member carrier 28. A pressing ball 24.2 is housed in the bottom of the U-shaped cavity 24.1, for contacting an external face of the circular protruding portion. That external face is advantageously curved and convex so that the contact with the pressing ball 24.2 is close to a point contact substantially lowering frictional forces in rotation.

The closing member carrier 28 shows for instance a first external cylindrical surface 28.2 and a second external cylindrical surface 28.3 of a lower diameter than the first external cylindrical surface 28.2. The first external cylindrical surface 28.2 is engaged in a sliding fashion in a corresponding bore formed in the bushing 26 whereas the second external cylindrical surface 28.3 is engaged in a sliding fashion in a corresponding bore formed in a press-ring 30 interposed between a front cylindrical face of the bushing 26 and a stack of flexible membranes 32 resting on a shoulder formed in the valve body 4.

The body 16 of the closing member 12 comprises a rear threaded stud 16.1 engaged in a corresponding threaded blind hole 28.4 formed in the closing member carrier 28. As this is apparent in FIG. 1, the stack of flexible membranes 32 is fitted around the threaded stud 16.1 of the body 16 of the closing member 12 and pinched between an outer surface of the closing member body 16 located directly around the threaded stud 16.1 and the front circular face of the closing member carrier 28. In other words, the stack of flexible membranes is fixed to the closing member 12 and the closing member carrier 28 during assembly thereof.

Back to the bushing 26, the latter is rigidly fastened to the body by a threaded engagement that pinches the outer periphery of the stack of flexible membranes 32 between the shoulder of the valve body 4 on which it rests and the press-ring 30 interposed between the stack of flexible membranes 32 and the front cylindrical face of the bushing 26. The latter can show a non-circular outer surface, e.g., a hexagonal surface, to allow rotational engagement with a tightening tool.

The stack of flexible membranes 32, advantageously made of metal, e.g., spring steel, provides a gas tight barrier of the chamber in the gas passage where the closing member 12 is located.

Figure 2:
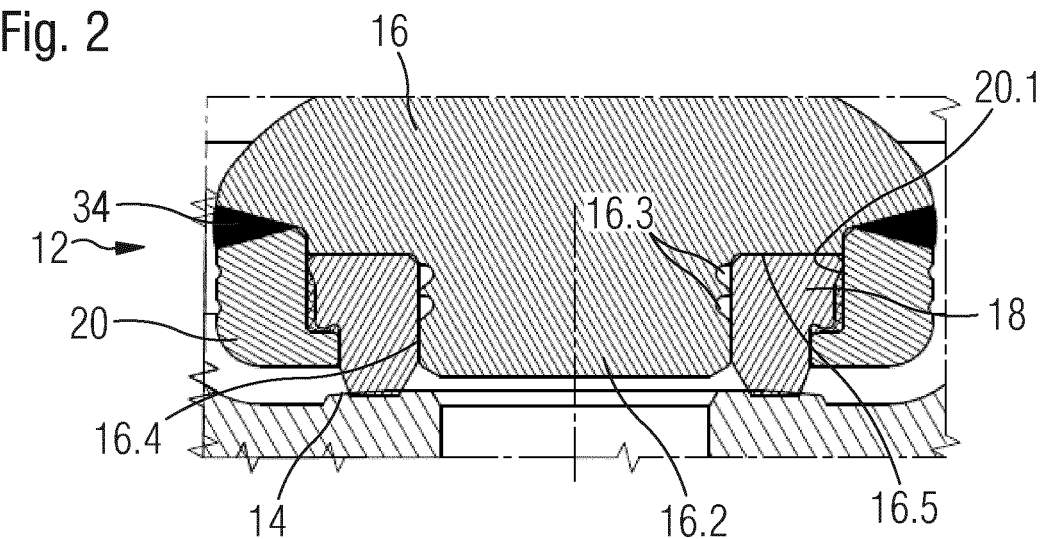
FIG. 2 is an exemplary magnified view of the closing member and the seat of the gas valve of FIG. 1, in accordance with various embodiments of the invention.

FIG. 2 is an enlarged view of the closing member 12 and its seat 14 of FIG. 1. The central protrusion 16.2 of the closing member body 16 comprises on its radially outer surface two circular grooves 16.3 into which the material of the seal 18 is pressed. In FIG. 2, the seal is represented in its original shape, i.e., not deformed by the retainer, whereas in practice, the seal material is radially pressed by the retainer 20 into the circular grooves 16.3. To that end, the retainer 20 shows a profiled radially inner surface 20.1 that is wedged such that upon placement longitudinally around the seal 18, the wedged radially inner surface radially presses the seal material into the circular grooves 16.3. As this is apparent, the retainer 20 is attached to the closing member body 16 by a weld seam 34 extending around an outer periphery thereof.

The above construction allows the valve to operate properly at very high pressures of up to 600 bar. At more usual pressures for industrial gas, e.g., of about 200 bar, the inventors of the present application have discovered that it is in principle not an issue if the gas under pressure penetrates between the radial outer surface 16.4 of the central protrusion 16.2 and the radially inner surface of the seal 18, and potentially further between the circular front face of the closing member body 16 and the corresponding surface of the seal 18, essentially because that small amount of gas under pressure could escape from between the closing member body 16 and the seal 18 during use (e.g., when the high pressure in a gas cylinder progressively diminishes) without moving the seal 18 relative to the closing member body 16. The L-shape cross-section of the retainer is sufficient for avoiding the seal 18 to move relative to the closing member body. At higher pressure, this is however not the case anymore. The presence of the at least one circular groove 16.3 combined with the radially pressing action of the retainer 20 of the material of the seal 18 into the at least one circular groove 16.3 avoids penetration of gas under pressure between the closing member body 16 and the seal 18. This thereby avoids the seal 18 to be potentially displaced when the closing member is operated at higher pressures, e.g., up to 600 bar.

Figure 3:
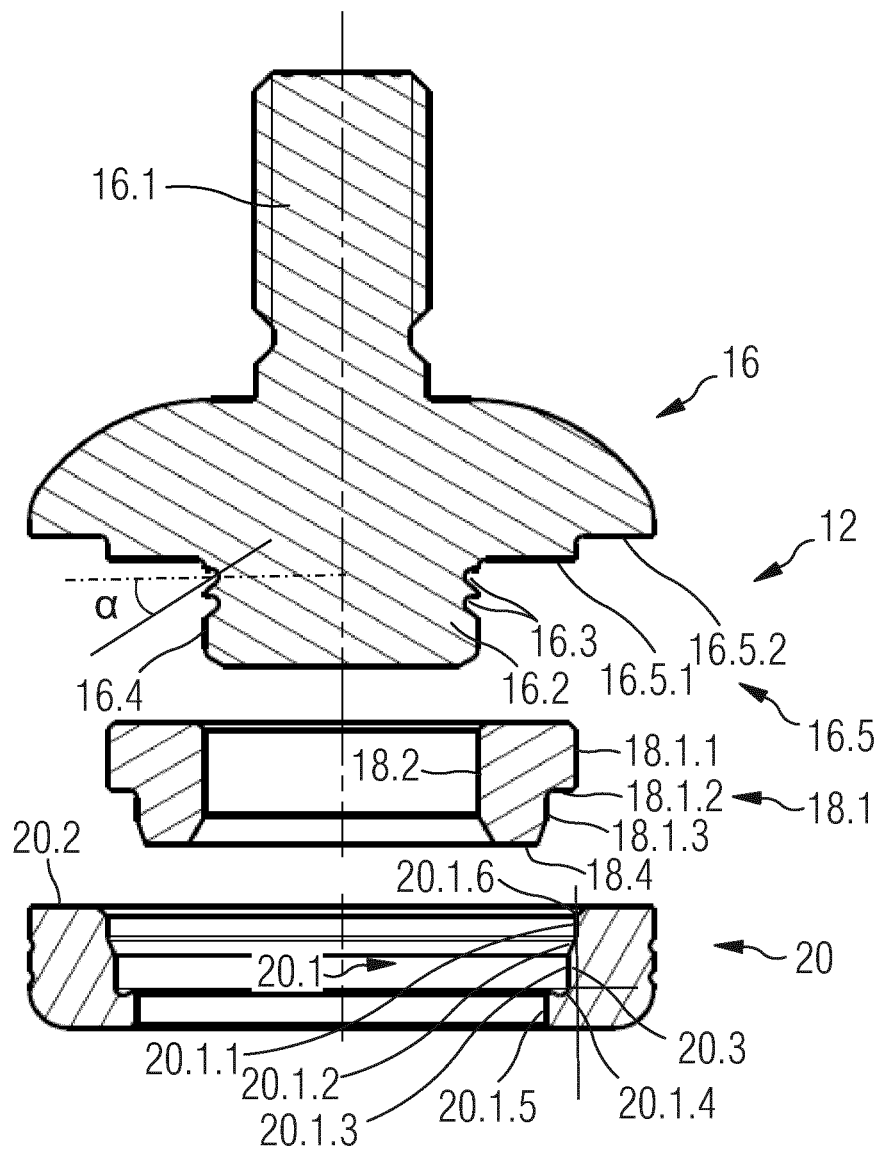
FIG. 3 is an exemplary exploded sectional view of the closing member of the gas valve of FIGS. 1 and 2, in accordance with various embodiments of the invention.

FIG. 3 is a sectional exploded view of the closing member 12 of FIGS. 1 and 2. More specifically, FIG. 3 shows the closing member body 16, the seal 18 and the retainer 20.

As this is apparent, the circular front face 16.5 of the closing member body 16 can shows a stepped profile, i.e., an inner annular portion 16.5.1 contacting the seal 18, and an outer annular portion 16.5.2 forming a recess relative to the inner annular portion 16.5.1, contacting the retainer 20 and receiving the weld seam 34 (FIG. 1). The inner and outer annular portions 16.5.1 and 16.5.2 are in various instances planar.

The central protrusion 16.2 of the closing member body 16 shows a radially outer surface 16.4 that is cylindrical, from the circular front face 16.5, for instance the inner portion 16.5.1 thereof, to a chamfer at a distal end of the central protruding portion 16.2. The two circular grooves 16.3 are advantageously located on a longitudinally half-portion of the radially outer cylindrical surface 16.4 of the central protruding portion 16.2 of the closing member body 16, the half-portion being adjacent the circular front face 16.5 of the closing member body 16. At least one, in various instances each one, of the two circular grooves 16.3 is located on a longitudinally intermediate portion of the radially outer surface 16.4, meaning that the circular groove 16.3 is longitudinally distant from each of two longitudinally opposed ends of the radially outer surface 16.4.

As this is apparent, the circular grooves 16.3 show each a curved and U-shaped cross-section. It shows a penetration direction that is inclined by an angle α relative to a plane perpendicular to the longitudinal axis, the inclination being oriented away from the front circular face. The inclination angle α can be comprised between 30° and 60°. That orientation is advantageous for both manufacturing and performance reasons. Indeed, when turning the circular grooves on a lathe, it is substantially easier to orient the cutting tool accordingly, thereby avoid any risk of interference with the circular front face 16.5. Also during assembly of the closing member 12, in particular of the retainer 20 on the seal 18 that is beforehand fitted around the central protrusion 16.2 and against the circular front face 16.5 of the closing member body 16, a combination of radial (due to compression) and longitudinal (due to friction) forces is exerted on the seal. The resulting force is then oriented with an inclination that is close or equal to the inclination angle α of the main direction of the cross-sectional profile of the circular grooves 16.3. This is therefore favorable for a proper insertion of the seal material into the circular grooves 16.3.

The seal 18 shows a radially outer surface 18.1 with a cross-sectional profile that is generally L-shaped, i.e., with a greater longitudinal branch 18.1.1 and a shorter radial branch 18.1.2. Both branches 18.1.1 and 18.1.2 are in various instances straight before being contacted by the retainer 20. The radially outer surface 18.1 of the seal 18 comprises also a further portion 18.1.3 that is longitudinal and adjacent the shorter radial branch 18.1.2 of the L-shaped cross-sectional profile.

As already indicated above, the radially inner surface 18.2 of the seal 18 is cylindrical, i.e., straight and longitudinal, before being in contact with the closing member body 16.

The seal 18 comprises also a rear surface 18.3 that contacts the inner annular portion 16.5.1 of the circular front face 16.5 of the closing member body 16. The front surface 18.4 of the seal is for contacting the seat 14 (see FIGS. 1 and 2).

The retainer 20 shows a profiled and wedged radially inner surface 20.1. That radially inner surface 20.1 is designed for contacting the above described radially outer surface 18.1 of the seal 18 and more particularly for pressing the seal material 18 into the circular grooves 16.3. Its cross-sectional profile is L-shaped similarly to the radially outer surface 18.1 of the seal 18, i.e., with a longer longitudinal branch 20.1.1+20.1.2+20.1.3, and a shorter radial branch 20.1.4. Contrary to the branches of the L-shaped profile of the radial outer surface 18.1 of the seal 18, the longer longitudinal and shorter radial branches 20.1.1+20.1.2+20.1.3 and 20.1.4 are not straight.

The longer longitudinal branch 20.1.1+20.1.2+20.1.3 comprises a first longitudinal portion 20.1.1 that is straight and shows a diameter that is the same as the diameter of the longer longitudinal branch 18.1.1 of the L-shaped radially outer surface 18.1 of the seal. The longer longitudinal branch 20.1.1+20.1.2+20.1.3 further comprises a second longitudinal portion 20.1.3 that can also be straight and shows a diameter that is less than the diameter of the first longitudinal portion 20.1.1, and an intermediate inclined portion 20.1.2 interconnecting the first and second longitudinal portions 20.1.1 and 20.1.3. For instance, the intermediate inclined portion is straight but could show a curved profile. That portion forms a ramp for radially compressing the seal material during mounting of the retainer 20 on the seal 18. It can be considered that the second longitudinal portion 20.1.3 and the intermediate inclined portion 20.1.2 protrude radially inwardly for compression purposes of the seal material. The volume of that radially inwardly protruding portion, illustrated by 20.3 in FIG. 3 (right cross-section of the retainer 20) is about the same as the volume of the circular grooves 16.3. It is in various instances comprised between 50% and 100% of the volume of the circular grooves 16.3.

The shorter radial branch 20.1.4 of the L-shaped cross-sectional profile of the radially inner surface of the retainer 20 shows a curved and concave profile so that a distal end of the branch forms a rip oriented longitudinally towards the seal 18.

The radially inner surface 20.1 of the retainer 20 comprises a further portion 20.1.5 adjacent the distal end of the shorter radial branch of the L-shaped cross-sectional profile of the radially inner surface 20.1. That further portion 20.1.5 is longitudinal and shows a reduced diameter compared with the longer longitudinal branch of the L-shaped cross-sectional profile of the radially inner surface 20.1; that reduced diameter corresponding to the diameter of the further portion 18.1.3 of the radially outer surface 18.1 of the seal 18.

The longer longitudinal branch 20.1.1+20.1.2+20.1.3 can comprise a radially outwardly tapering portion 20.1.6 for facilitating engagement of the radially inner surface 20.1 of the retainer 20 along the radially outer surface 18.1 of the seal 18.

The retainer 20 comprises a rear surface 20.2 that contacts the outer annular portion 16.5.2 of the circular outer face 16.5 of the body of the closing member body 16 and thereafter subject to welding for forming the welding seam 34 (FIG. 2).

The closing member body 16 and the retainer 20 are advantageously made of metal whereas the seal 18 is advantageously made of softer non-metallic material, like plastic material.

The above described construction is particularly advantageous in that it provided a highly reliable gas valve, in particular for very high pressure, i.e., about 300 bar.

What is claimed is:

1. A valve closing member for cooperating with a valve seat, said valve closing member comprising:
    a body with a front circular face forming a central protrusion along a longitudinal axis of the body;
    a seal forming a ring fitted on the front circular face and around the central protrusion; and
    a retainer forming a ring surrounding the seal and attached to the body for retaining the seal on the body, the retainer comprising an inner surface contacting the seal and being L-shaped with a shorter radial branch and a longer longitudinal branch comprising an intermediate inclined portion forming a ramp for radially compressing the seal during mounting of the retainer on the seal,
    wherein the seal shows a radially inner surface contacting a radially outer surface of the central protrusion, the radially inner surface and radially outer surface being both cylindrical, the radially outer surface showing, on a longitudinally intermediate portion thereof, at least one circular groove into which the seal is radially pressed by the retainer.

2. The valve closing member according to claim 1, wherein the radially inner surface and the radially outer surface being both cylindrical extend longitudinally over an entire active length of the central protrusion.

3. The valve closing member according to claim 1, wherein the radially inner surface and the radially outer surface being both cylindrical extend longitudinally from the front circular face until a distal end of the central protrusion.

4. The valve closing member according to claim 1, wherein each of the at least one circular groove shows a width that is less than 50% of a total length in the longitudinal direction of the central protrusion along the radially outer surface thereof.

5. The valve closing member according to claim 1, wherein the at least one circular groove comprises at least two of the circular grooves.

6. The valve closing member according to claim 1, wherein the at least one circular groove is formed on a proximal half portion of the radially outer surface of the central protrusion, the proximal half portion being adjacent to the front circular face.

7. The valve closing member according to claim 1, wherein the at least one circular groove shows a penetration direction that is inclined relative to a plane perpendicular to the longitudinal axis, the inclination being oriented away from the front circular face.

8. The valve closing member according to claim 7, wherein the inclination of the penetration direction of the at least one circular groove is of an angle α comprised between 30° and 60°.

9. The valve closing member according to claim 1, wherein the longer longitudinal branch of the L-shaped cross-sectional profile of the inner surface of the retainer comprises a proximal end portion that widens radially outwardly.

10. The valve closing member according to claim 1, wherein the shorter radial branch of the L-shaped cross-sectional profile of the inner surface of the retainer is curved and concave so that a distal end of the branch forms a rip oriented longitudinally towards the seal.

11. The valve closing member according to claim 1, wherein the seal has a radially outer surface showing a cross-sectional profile that is L-shaped and is contacted by the L-shaped cross-sectional profile of the inner surface of the retainer.

12. The valve closing member according to claim 11, wherein the L-shaped profile of the cross-section of the radially outer surface of the seal comprises a shorter distal radially extending branch and a longer longitudinally extending branch, wherein at least one of the branches is straight before the retainer is mounted to surround the seal.

13. The valve closing member according to claim 1, wherein the retainer is attached to the body by a welding seam at an outer periphery of the retainer and the body.

14. A valve for compressed gas, said valve comprising:
    a valve body with a gas inlet, a gas outlet and a gas passage fluidly interconnecting the gas inlet and gas outlet;
    a seat in the valve body and crossed by the gas passage;
    a valve closing member configured for cooperating with the seat for selectively opening and closing the gas passage; and
    an actuating mechanism for moving the closing member between an opening position and a closing position of the gas passage;
    wherein the valve closing member comprises:
        a body with a front circular face forming a central protrusion along a longitudinal axis of the body;
        a seal forming a ring fitted on the front circular face and around the central protrusion; and
        a retainer forming a ring surrounding the seal and attached to the body for retaining the seal on the body, the retainer comprising an inner surface contacting the seal and being L-shaped with a shorter radial branch and a longer longitudinal branch comprising an intermediate inclined portion forming a ramp for radially compressing the seal during mounting of the retainer on the seal,
    wherein the seal shows a radially inner surface contacting a radially outer surface of the central protrusion, the radially inner surface and radially outer surface being both cylindrical, the radially outer surface showing, on a longitudinally intermediate portion thereof, at least one circular groove into which the seal is radially pressed by the retainer.

* * * * *